United States Patent [19]
Farmer

[11] 3,871,042
[45] Mar. 18, 1975

[54] INFLATABLE VEHICLE CONSTRUCTION
[76] Inventor: Gary W. Farmer, 310 W. Ash, Caldwell, Idaho 83605
[22] Filed: Jan. 20, 1974
[21] Appl. No.: 437,279

Related U.S. Application Data
[63] Continuation-in-part of Ser. No. 310,741, Nov. 30, 1972, abandoned.

[52] U.S. Cl. ..................... 9/1 A, 9/11 A, 280/12 B
[51] Int. Cl. .............................................. B63c 9/04
[58] Field of Search ........ 9/1 A, 11 R, 11 A, 310 F, 9/310 G, 311, 347; 280/12 B; 272/1 B

[56] References Cited
UNITED STATES PATENTS
2,223,625  12/1940  Krupp ................................. 9/11 A
2,246,108   6/1941  Sermon ................................. 9/347
2,876,467   3/1959  Lund ..................................... 9/11 A
3,432,182   3/1969  Solipasso ............................. 9/11 A
3,435,471   4/1969  Drennen, Jr. ...................... 9/310 F
3,628,206  12/1971  Mecham ................................ 9/1 A

*Primary Examiner*—Trygve M. Blix
*Assistant Examiner*—Jesus D. Sotelo
*Attorney, Agent, or Firm*—John W. Kraft; Charles L. Kraft

[57] ABSTRACT

The inflatable vehicle construction for inflatable rings and the like comprises a cuff made of fabric portions operable to conform to the outer walls of the ring, a vehicle bottom fastened to the cuff about the lower portion of the cuff, and a drawcord at the upper terminal edge of the cuff.

5 Claims, 5 Drawing Figures

INFLATABLE VEHICLE CONSTRUCTION

REFERENCE TO OTHER APPLICATIONS

This is a continuation-in-part of my application serial 310,741, filed November 30, 1972 now abandoned.

FIELD OF INVENTION

The present invention relates to inflatable vehicles and more particularly to inflatable vehicle constructions which may be applied to inflatable rings and the like.

DESCRIPTION OF THE PRIOR ART

Inflatable vehicles, such as inflatable rafts, are typically fabricated as a single construction. Inherent in this unitary construction is a complicated means of constructing inflatable vehicles and a complicated and laborious method of maintaining and repairing inflatable vehicles. Typically, this means that an imperfection or a tear in one of the air-retaining cells results in extensive patching or in complete loss of the vehicle. Further, it has been found that inflatable vehicles, which find great favor in certain aquatic recreation, are difficult to store, are not fully suited to recreational uses, and may be expensive owing to the typical unitary fabricating means. A primary characteristic of inflatable vehicles has been the lack of means for fluid planing, particularly when the vehicle is used in tow or as a river float vehicle. This characteristic is evident in one-man and two-man vehicles.

Accordingly, it is a primary object of the present invention to provide an inflatable vehicle having means for planing for tow, river floats, surfing, and the like.

It is an object of the present invention to provide an inflatable vehicle construction which may employ an inflatable ring, such as an inner tube and the like.

It is a further object of this invention to provide an inflatable vehicle construction which may be removed from the inflatable ring.

It is an object of this invention to provide an inflatable vehicle construction which may be provided with a mesh bottom to facilitate passage of water.

It is another of this invention to provide an inflatable vehicle construction which may be provided with suitably fastened tow rings and handles.

These and other objects shall become apparent from the description following, it being understood that modifications may be made without affecting the teachings of the invention here set out.

SUMMARY OF THE INVENTION

The inflatable vehicle construction for inflatable rings and the like comprises a cuff made of fabric portions operable to conform to the outer walls of the rings, a vehicle bottom fastened to the cuff about the lower portion of the cuff, and a drawcord at the upper terminal edge of the cuff. The inflatable vehicle construction may include a tow ring fastened within the inner face of the cuff and the vehicle bottom, and handles suitably fastened at intervals about the cuff.

A more thorough and comprehensive understanding may be had from the detailed description of the preferred embodiment when read in connection with the drawings forming a part of this specification.

Figure 1:
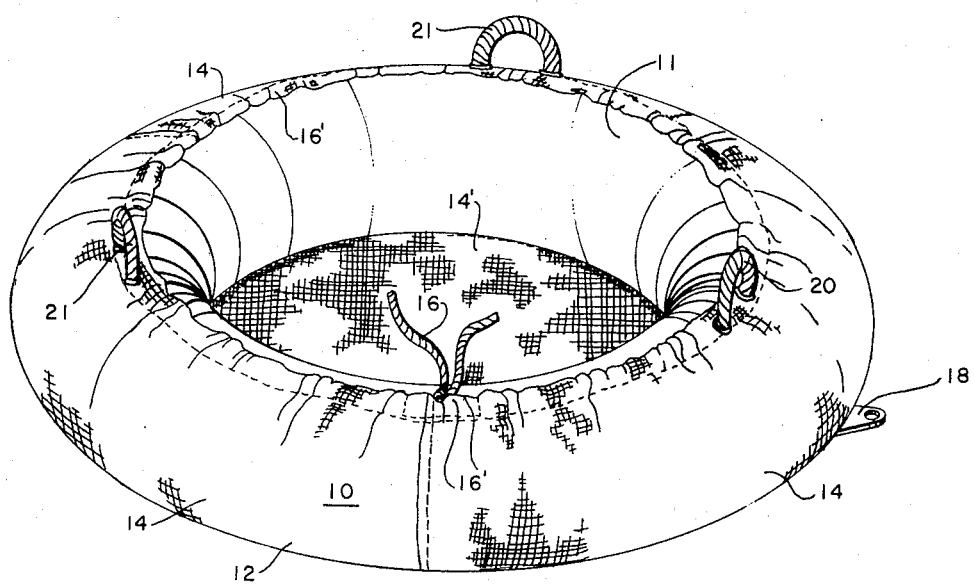
FIG. 1 is a top perspective view of the inflatable vehicle construction of this invention.
Figure 2:
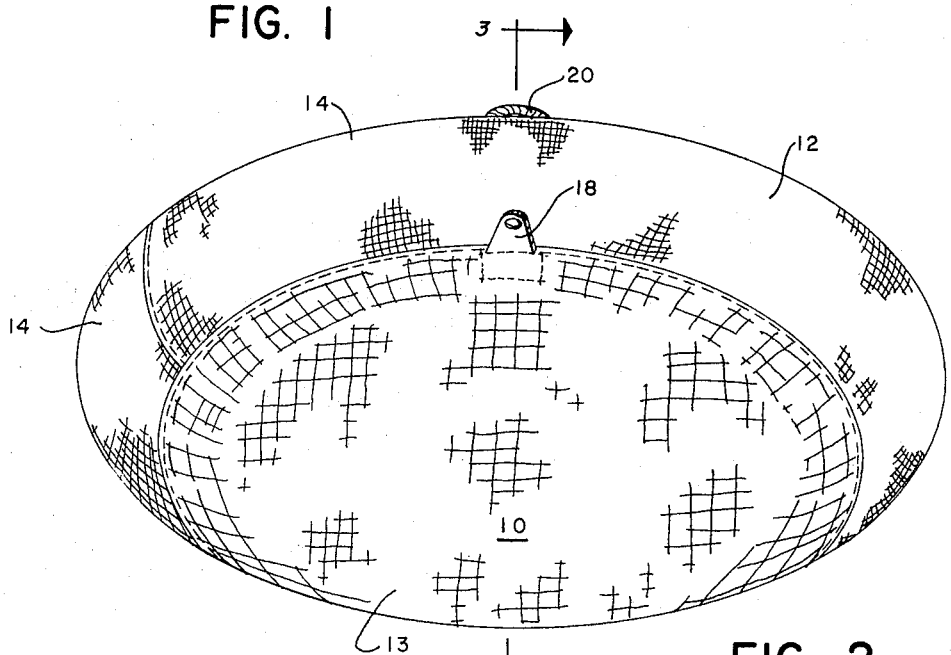
FIG. 2 is a bottom perspective view of the apparatus of the FIG. 1.

DETAILED DESCRIPTION OF THE PREFERRED EMBODIMENT:

Referring now to the drawings and more particularly to the FIGS. 1 and 2, the inflatable vehicle construction of this invention is shown to advantage and generally identified by the numeral 10. The vehicle construction 10 is intended to be mounted over an inflatable ring, such as a commonly known inner tube 11. The vehicle construction 10 comprises a ring cuff 12 and a vehicle bottom 13.

The vehicle cuff 12 may be fabricated of any of a variety of suitably bound fabric side portions 14 and a bottom portion 14'. It is to be understood that the vehicle cuff 12 may also be fabricated from a single piece of bound fabric, if found convenient in production. The side portions 14 are bound so that the portions 14 cover a curved portion about the outer periphery of the tube 11 distally interior of the uppermost and lowermost apexes or invert portions of the tube 11. The lower portion 14' is circumferentially, tangentially disposed to the lowermost apex, and may be suitably fastened at the bottom of the vehicle construction 10 distally upwardly of the cuff 12. Portions 14 and 14' are intended to tightly conform to this curved configuration when the vehicle construction 10 is drawn over the tube 11, before and after inflation as herein later described. The cuff 12 may be fabricated of any of a variety of suitable materials, such as canvas, polyvinyl-covered cloth and flexible polymer sheet. The uppermost terminal side of the vehicle bottom 13 is adjacently disposed, in face to face relationship to the lowermost terminal side of the bottom portion 14' of the cuff 12, and is suitably fastened at the bottom of the vehicle construction 10 distally upwardly from the cuff 12 as shown in the FIG. 3. The vehicle bottom 13 may be fabricated from any of a variety of suitable materials, such as polymer sheeting laminated to canvas or flexible polymer sheeting laminated to canvas. It is to be understood that when the vehicle bottom wall 13 is laminated to canvas and suitably fastened to portions 14, the bottom portion 14' of the cuff 12 would become integral with the portions 14. The vehicle bottom 13 may also be fabricated of a flexible mesh fabric suitable for some recreational uses. The vehicle construction 10 is secured on the tube 11 by means of a drawcord 16 which is slidably carried within a cord-carrying means, such as a hem 16', about the upper terminal edge of the cuff 12. A variety of other binding reams retaining the cord 16 may be used, such as rings, grommets and the like. A tow ring 18 may be securely fastened at the joint between the inner face of the cuff 12 and the vehicle bottom 13. The tow ring 18 may be used in securing the vehicle construction 10 and the inner tube 11 in transport, or may be employed with a towrope 19, shown in the FIGS. 3, 4, and 5 hereinafter described. A handle 20 is fastened distally from the upper terminal edge of the cuff 12, distally above the tow ring 18. A plurality of handles 21 may be provided at preselected intervals about the circumference of the cuff 12.

Figure 3:
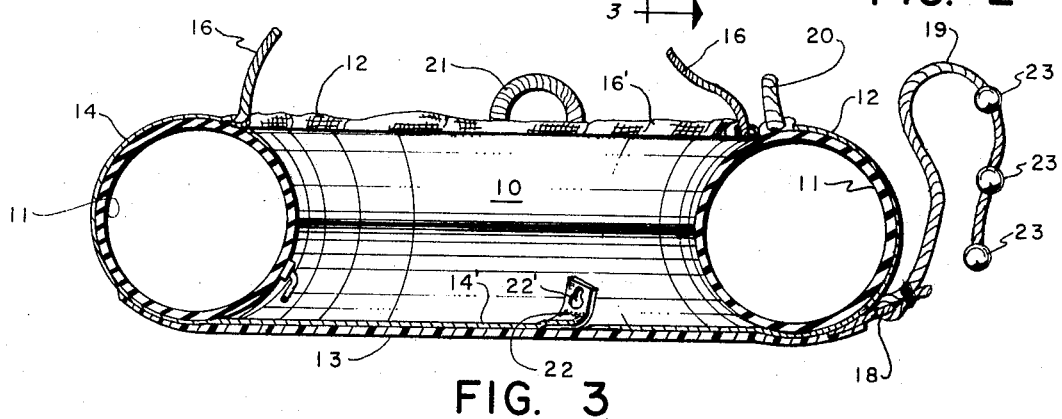
FIG. 3 is a cross-sectional view taken along the lines 3—3 of the FIG. 2 showing the interior configuration thereof.
Figure 4:
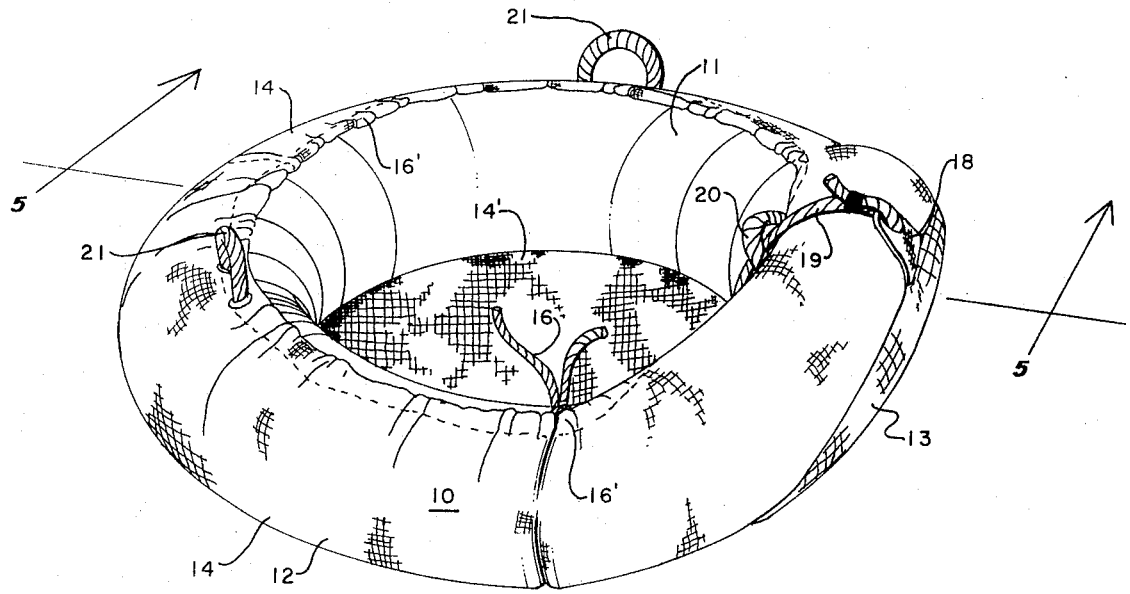
FIG. 4 is a perspective view of the construction shown in its operating position.
Figure 5:
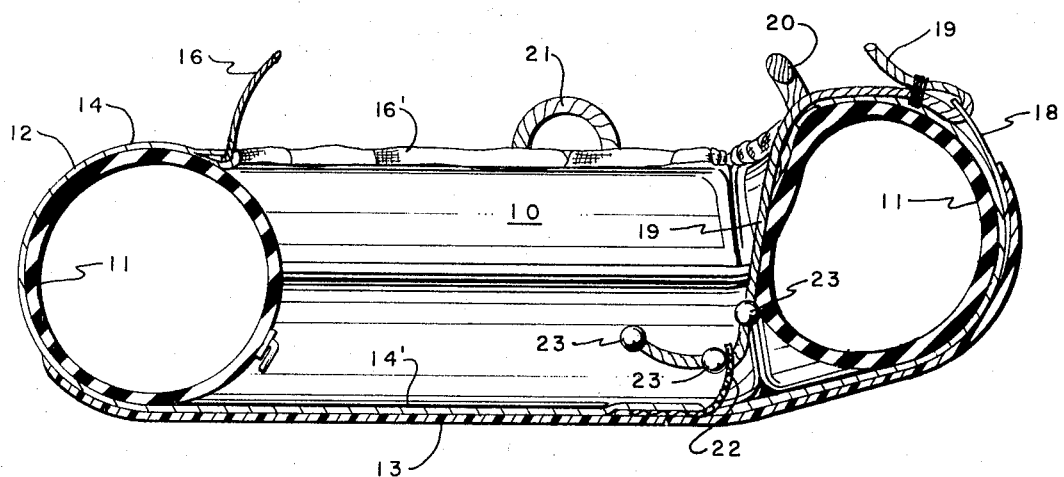
FIG. 5 is a cross-sectional view taken along lines 5—5 of the FIG. 4 of the construction in its operating position.

As seen in the FIGS. 3, 4 and 5, a tie means 22 is mounted centrally in the vehicle bottom 13, and is operable to receive a shackle means disposed distally on the tow rope 19 opposite the tow ring 18. The shackle means may be a plurality of balls 23 engageable with a concentrical hole 22' disposed centrally in the tie ring 22. It may be seen that a variety of other shackles may be employed to similar effect. The material forming the tie ring 22 may be secured to and disposed between the layers of the bottom 13 and the bottom portion 14' of the cuff 12 and bound by suitable stitching. The tie rings 22 may also be suitably secured with rivets, grommets and the like.

The vehicle construction 10 may be secured on a deflated inner tube 11 by pulling the cuff 12 over the outermost walls of the tube 11, drawing the draw cord 16 until the cuff 12 is taut about and conforms with the tube 11, and tieing the cord 16. A bow-like configuration is achieved by pulling the two rope 19 over the exterior of the covered innertube 11, thus deforming the innertube 11. The ball-like shackle 23 is engaged with the hole 22' in the tie ring 22 to secure the innertube in the configuration. The rider may then employ the handles 20 and 21 to guide the construction 10 in the desired direction of travel. It has been found to advantage to dispose the handles 20 and 21 at approximately 90° with the tow ring 18 disposed between handles 20 and 21.

One use of the vehicle 10 is as a hydroplane. In this way, a rider may pull the handle 20 upwardly and toward the side opposite the vehicle in a planing-like or ski-like configuration, This presents a smooth planing portion to overcome resistance on snow or water. The handle 20 may be used to distort the planing portion of the vehicle with respect to the line of attack of the water or snow to provide steering. The amount by which the handle 20 is raised may be used to influence speed. This use is operable in river and snow floats, surfing, or by tows including the tow ring 18.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. In combination with inflatable annular ring, an inflatable vehicle construction comprising a cuff fabricated to conform about the circumference of said ring over a portion of the outside periphery of said ring distally interior of the upper and lower apexes of said ring, a drawcord slidably carried in a suitable cord-carrying means disposed about the upper terminal edge of said cuff, a flexible bottom fastened about the lower terminal edge on the ring-contacting side of said cuff, a tow ring disposed distally from the lower edge of said cuff, and a tie ring secured centrally in the upper side of said bottom engageable with the two rope section which provides means for deforming said ring covered by said vehicle construction into a bow-like configuration and for securing said construction into said configuration.

2. The article of claim 1 including a plurality of handles fastened at approximately 90° to each other in the upper portion of said cuff with said two ring disposed centrally between said handles.

3. The article of claim 1 including a plurality of handles fastened at intervals distally from the upper terminal edge of said cuff.

4. The article of claim 1 wherein said bottom is fabricated of sheeting of suitable material.

5. The article of claim 1 wherein said bottom is fabricated of a flexible mesh fabric.

* * * * *